July 29, 1952 V. HORN 2,605,159

TRIANGULAR TELEVISION AND RADIO CABINET

Filed Feb. 18, 1950 3 Sheets-Sheet 1

INVENTOR

VICTOR HORN

BY Gustave Miller

ATTORNEY

July 29, 1952 V. HORN 2,605,159

TRIANGULAR TELEVISION AND RADIO CABINET

Filed Feb. 18, 1950 3 Sheets-Sheet 2

INVENTOR
VICTOR HORN

BY Gustave Miller
ATTORNEY

TRIANGULAR TELEVISION AND RADIO CABINET

INVENTOR
VICTOR HORN

BY Gustave Miller
ATTORNEY

Patented July 29, 1952

2,605,159

UNITED STATES PATENT OFFICE 2,605,159

TRIANGULAR TELEVISION AND RADIO CABINET

Victor Horn, Washington, D. C.

Application February 18, 1950, Serial No. 145,025

9 Claims. (Cl. 312—7)

This invention relates to a television cabinet and has for an object to provide an improved television cabinet especially adapted and arranged for use in a corner of a room whereby it may be visible from the largest part of the room thereby increasing the viewability and comfort of the spectators.

A further object of this invention is to provide a television cabinet which may be made in either of two forms, one of which is most suited for use in the corner of the room and the other of which form is arranged to be used either in the corner of a room the same as the first form or is likewise adapted for use in the conventional manner anywhere in the room.

A further object of this invention is to provide a television cabinet or radio cabinet which is substantially triangular more or less in top plan view so that two sides of the cabinet will be locatable along the walls adjoining the corner of a room whereby its third side is best visible and viewable to the greatest area of the room.

A further object of this invention is to provide a modified form of a television and radio corner cabinet which may be used with a triangular plan view outline in the corner of a room and likewise is arranged to be changed over so as to have a conventional rectangular plan view outline for use anywhere, the changeover from one style to the other being very simple and not requiring the use of any skill or tools.

A further object of this invention is to provide a triangular corner television cabinet which may be either permanently triangular or may be readily convertible between a triangular and rectangular outline and which may be made in either table or console models.

From the foregoing and other objects in view, as will hereinafter become apparent, this invention comprises the combinations, constructions and arrangements of parts hereinafter set forth, claimed and illustrated in the accompanying drawings, wherein Fig. 1 is a top plan view of the triangular corner television or radio cabinet of this invention.

This invention consists of a corner cabinet of triangular shape, the three main sides of which are made large enough to house a television receiving apparatus. This cabinet to be made in such a manner that it can be put in the corner of a room. The cabinet can be made of wood, metal or plastic. It can have either a straight, curved or otherwise designed front. It can be made as a table model to put on a three cornered triangular table or triangular stand. It can also be made as a floor model with cabinet underneath to house a radio-phonograph combination or record cabinet, etc.

The advantage of having the corner cabinet for television is that if the television receiver is put in a corner, it can be seen from a larger part of the room thereby increasing the visibility and the comfort of the spectators. Also by placing the television receiving set in the corner of the room in a triangular cabinet it saves considerable space. It is much preferred over putting a square type receiver in a corner as the square type never fits and looks badly. The three cornered cabinet will look better and take up less space and be visible from a larger area and will enhance the placing of the rest of the furniture in the room.

The size of this cabinet will be determined by the size of the tube used. The front should be approximately 1½ times as wide as the depth of either back. The two back panels should be at 90° angle from each other. The two front corners may be rounded, beveled or fluted. The television cabinet proper should have an appropriate projection on the base to keep it away from the wall for ventilation or may rely on the wall base boards to space it from the wall. The two rear sides may be made removable and of thin Prestwood or like material perforated with holes to allow ventilation. This cabinet can be made in either one or two sections. The television cabinet can be made with a base separate or with a base attached. It is important to leave enough space between the triangular support for the top and the end of the picture tube so it can be plugged in and out.

Figure 1:
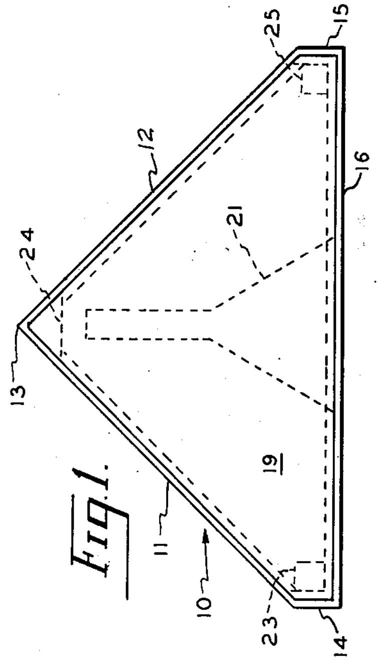
Figure 3:
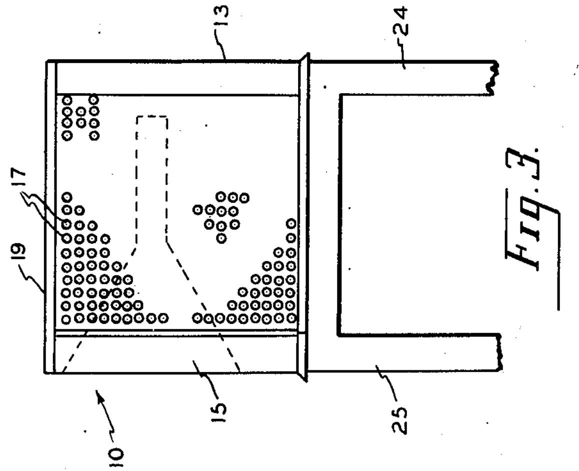
Fig. 3 is a side plan view of the triangular corner cabinet in the table model style.
Figure 9:
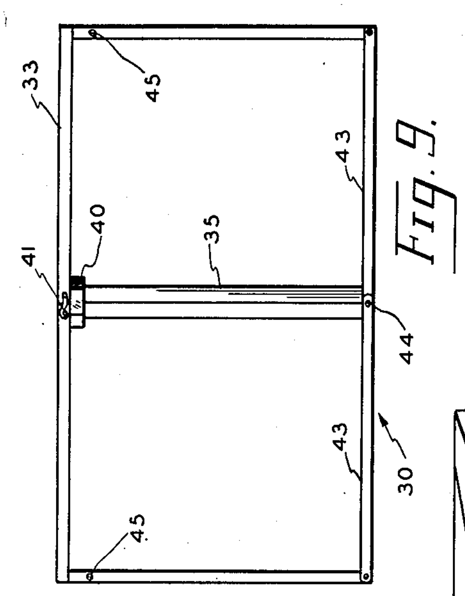
Fig. 9 is a back plan view of Fig. 7 (the mechanism being omitted).

There is shown at 10 the corner cabinet of this invention especially intended for television but obviously equally usable as a radio cabinet with no television features present. As shown in Fig. 1, this cabinet 10 is substantially triangular in plan view outline being provided with two short leg sides 11 and 12 meeting at a rear right angle 13 although, of course, it will be understood that the sides 11 and 12 could have their corners cut off or rounded at the angle 13 in the same manner that their forward ends are cut off at 14 and 15 where they join with the hypotenuse front face 16. Forward ends 14, 15 may be rounded instead of being straight. The sides 11 and 12 which will be concealed by the sides of the room when in operative position in a corner may consist of a grid work as shown at 17 thereby providing ample ventilation to the audio and video mechanism therewithin.

Figure 2:
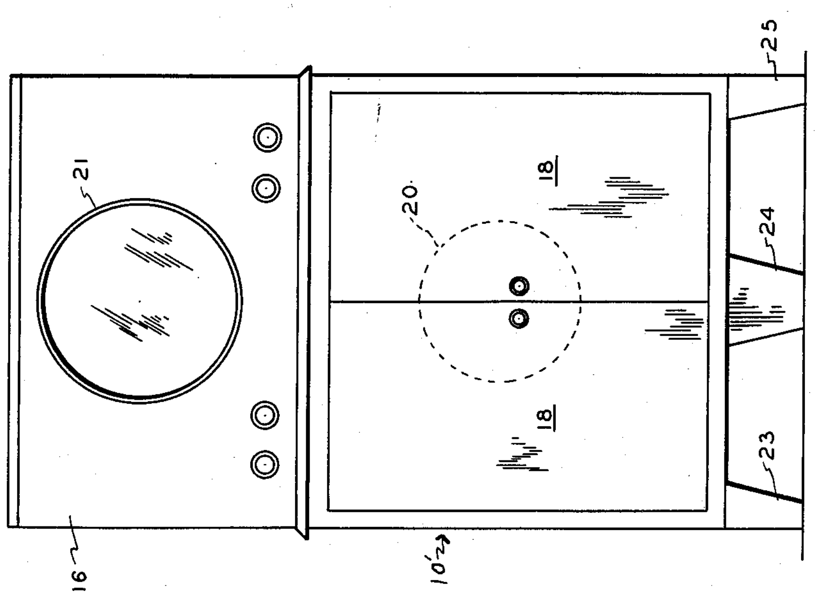
Fig. 2 is a front plan view of the triangular corner television or radio cabinet in the console style.
Figure 8:
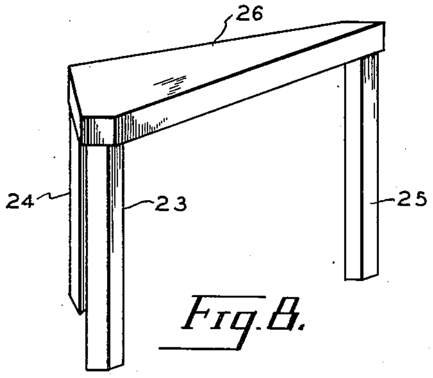
Fig. 8 is a perspective view of a table for supporting the table model style of either the permanent or convertible corner cabinet.

As shown in Fig. 2, the cabinet 10′ may be a console model which may be provided with lower doors 18 behind which may be located the usual audio speaker 20, the television tube being shown at 21. In the table model, the speaker may be located at 22. However, the location of the tube and the speaker may be varied as desired and both of them or either of them may be left permanently visible or may be provided with concealing doors of any desired make. In either form, three supporting legs 23, 24 and 25 will be provided one under each corner of the cabinet. In Fig. 8, the three legs have been shown as supporting a substantially triangular table 26 when it is desired that the table model be made separable from its supporting leg.

This permanently triangular form of the invention in either table or console model is intended for permanent use in the corner of a room, thus placing the third or front face of the cabinet with its video tube 21 and its audio speaker so as to provide the best viewability and audibility to the maximum area of the room whereby a larger video tube face may be used, both from the standpoint of the dimensions of the cabinet and from the standpoint of the viewability of the spectators, than would be possible in a rectangular room with the cabinet located along the middle of one of the walls as now customary with the conventional rectangular outline cabinet.

This invention also contemplates that the triangular corner cabinet may be made in a convertible form usable either in the triangular form with all the advantages thereof and easily converted to and from the rectangular form for use where conditions are such that only a rectangular outline form may be used. In this form, the television or radio cabinet 30 includes a triangular outline cabinet portion 31 which may be substantially identical with the permanent form shown at 10, including a front face 32 at the hypotenuse, a triangular top 33 similar to the triangular top 19 of the form 10 and similar short leg sides connected to the front by short cut-off sides 34 similar to the cut-off sides 14 and 15.

Figure 6:
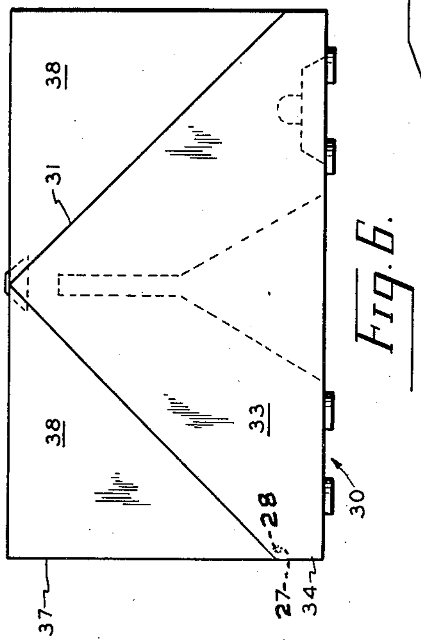
Fig. 6 is a top plan view of Fig. 4.
Figure 4:
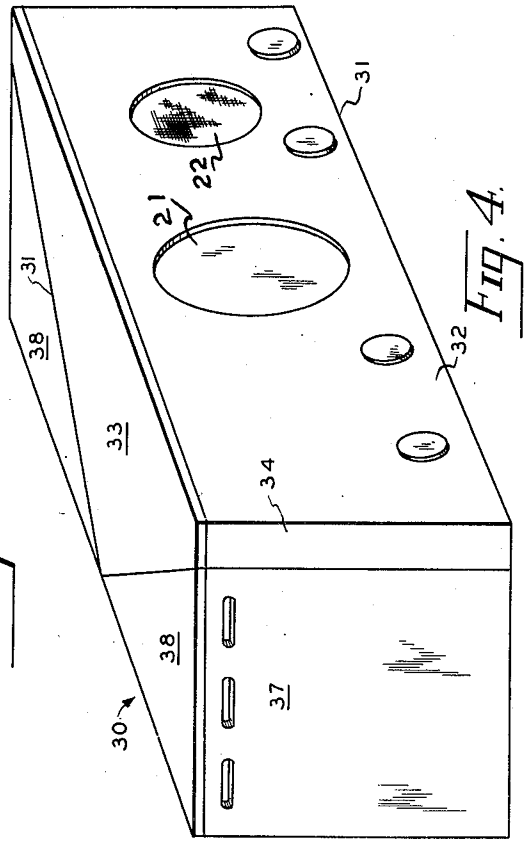
Fig. 4 is a perspective view of the convertible rectangular and triangular corner cabinet form.
Figure 5:
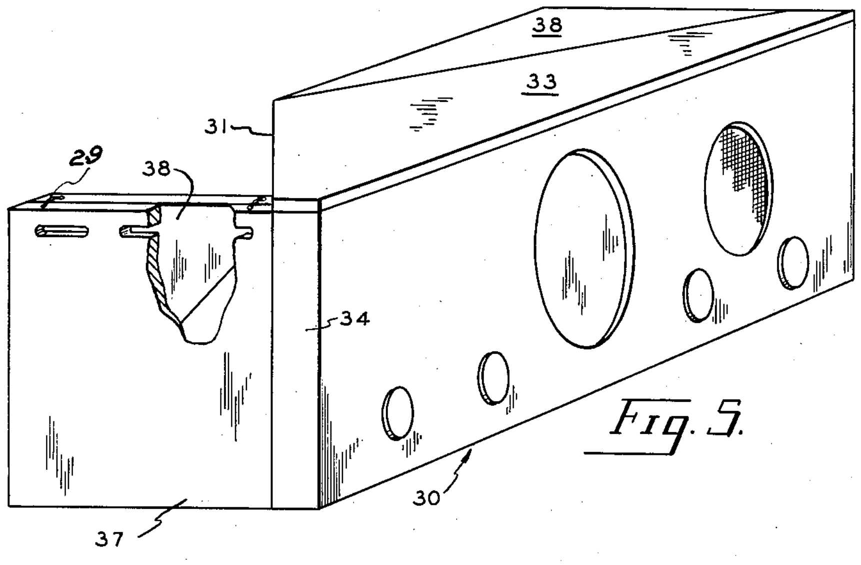
Fig. 5 is a view similar to Fig. 4 showing one side partly folded in the conversion process.
Figure 11:
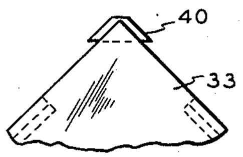
Fig. 11 is a fragmentary plan view similar to Fig. 10 with the convertible form in the triangular outline position.

A back apex corner post 35 extends between the top 33 and the bottom 36, the grid work being omitted or removed in this form. Pivoted along the rear vertical ends as by separable piano style hinges are foldable short leg side walls 37, to the top edges of which are pivoted by concealed invisible type hinges 29, the triangular top sections 38 which complement the top 33 so as to convert it from a substantially triangular outline, except for the cut-offs at the front corners, to a substantially rectangular outline as shown in Fig. 6. The height of the side wall 37 is such that when pivoted on the hinge to the cut-off side 34, it may fold under the edge of the top 33.

Figure 10:
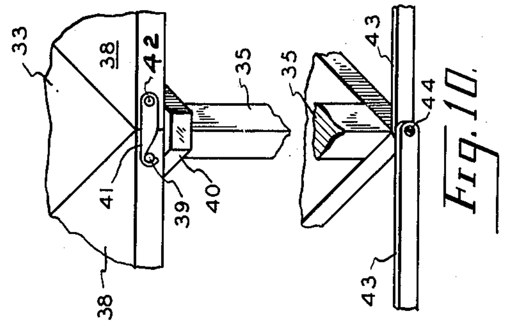
Fig. 10 is a fragmentary detail in perspective showing the operation of the top catch and side piece braces when in rectangular position.
Figure 7:
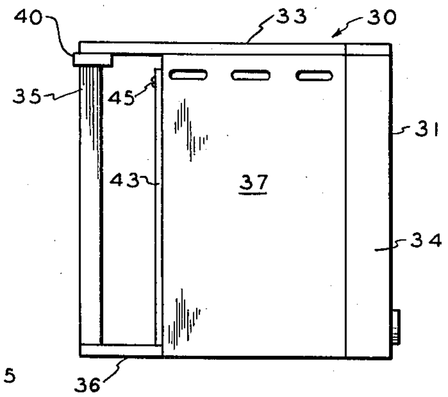
Fig. 7 is a side view of the convertible form in the triangular position.

When in the folded position, as shown in Fig. 7, the rear vertical end of the short leg side walls 37 will be spaced from the apex post 35 and likewise from each other thereby providing an ample opening for ventilation of the audio and radio mechanisms. The corner post 35 is provided at its top with an enlarged abutment 40 acting as a pedestal or support for the corners of the folding triangular top portions 38 as shown in Fig. 10, a hook latch 41 being pivoted at 42 to the back ends of the corner of one of the top portions 38 and arranged to be hooked over a screw-head 39 on the other top portion 38 thus holding the two top portions 38 in rigid cooperating position with the fixed top 33.

Brace bars 43 are pivoted one to each bottom vertical rear corner of the foldable short leg side walls 37 and are of a length that they will hook over a screw-head 44 at the bottom of the apex post 35 thus holding the bottom ends of the foldable side walls 37 in rigid open position. A similar screwhead 45 is provided at a proper distance up along the rear edge of side walls 37 for holding the brace bars 43 out of the way in vertical position when the cabinet is folded to the triangular position and the side walls 37 are retained in position thereon.

While it is contemplated that the side walls 37 may be permanently hinged to the cut-off sides 34, it is also contemplated that by using a readily removable hinge pin 27 in the piano style hinge 28 which pivots the folding side wall 37 to the cut-off side 34, that the pin could be removed whereby the side walls 37 and the triangular top portion 38 hinged thereto could be removed and stored elsewhere. It is also contemplated that the permanent form 10 can be placed on the market with one-half of a piano style hinge already in position on the inner vertical edge of the cut-off sides 34 and with the supporting abutment 40 and screw-head 44 already in position, while the grid work 17 could be made readily removable by being initially secured with screws or latches in a conventional manner.

The triangular form is especially intended for use in enabling large room audio and video reception to take place in a small room. However, when the owner of either the convertible form or of the permanent form with these attaching parts already in position finds it necessary or desirable to place the cabinet in a larger room or in a room where the furniture lay-out is such that it is more desirable to use the cabinet in a rectangular form, he can easily convert the triangular cabinet to a rectangular cabinet by thus adding the necessary side and top pieces and folding them to the rectangular position when so needed, re-folding them back to the triangular position at any time when such becomes necessary or desirable.

While the preferred forms of this invention have thus been set forth and described in detail, it will be understood that this invention is not restricted to the particular details of construction and arrangement hereinbefore set forth and illustrated in the accompanying drawings, and it will be understood that changes in such constructions and arrangement may be made within the scope of what is hereinafter claimed.

Having thus set forth the nature of this invention, what is claimed is:

1. A television or radio cabinet substantially triangular in top plan view outline, said cabinet having a substantially right angular rear apex, the hypotenuse side providing a front video or audio face and means for converting said triangular cabinet to a rectangular cabinet comprising short leg side walls, hinge means pivoting said short leg side walls adjacent the rear of said front face, triangular top members complementing the triangular cabinet top to a rectangle, hinge means pivoting one of said triangular top members to one of said short leg side walls along its top edge, and hinge means pivoting the other triangular top member to the other short leg side wall along its top.

2. A television or radio cabinet substantially triangular in top plan view outline, said cabinet having a substantially right angular rear apex, the hypotenuse side providing a front video or audio face and means for converting said triangular cabinet to a rectangular cabinet comprising short leg side walls, hinge means pivoting said short leg side walls adjacent the rear of said front face, triangular top members complementing the triangular cabinet top to a rectangle, hinge means pivoting one of said triangular top members to one of said short leg side walls along its top edge, and hinge means pivoting the other triangular top member to the other short leg side wall along its top, said hinge means being of the invisible type whereby said short leg side wall and folded top triangular member may fold under the edge of the permanent top member.

3. A television or radio cabinet substantially triangular in top plan view outline, said cabinet having a substantially right angular rear apex, the other two angles being somewhat cut off, the hypotenuse side providing a front video or audio face, the short leg sides having ventilation means for the contained mechanism and means for converting said triangular cabinet to a rectangular cabinet comprising short leg side walls, hinge means pivoting said short leg side walls adjacent the rear of said front face, triangular top members complementing the triangular cabinet top to a rectangle, hinge means pivoting one of said triangular top members to one of said short leg side walls along its top edge, and hinge means pivoting the other triangular top member to the other short leg side wall along its top whereby said short leg side wall and folded top triangular member may fold along the edge of the permanent top member.

4. A television or radio cabinet substantially triangular in top plan view outline, said cabinet having a substantially right angular rear apex, the hypotenuse side providing a front video or audio face and means for converting said triangular cabinet to a rectangular cabinet comprising short leg side walls, hinge means pivoting said short leg side walls adjacent the rear of said front face, triangular top members complementing the triangular cabinet top to a rectangle, hinge means pivoting one of said triangular top members to one of said short leg side walls along its top edge, and hinge means pivoting the other triangular top member to the other short leg side wall along its top, said hinge means being of the invisible type whereby said short leg side wall and folded top triangular member may fold under the edge of the permanent top member, and an apex post extending between the permanent triangular top and triangular bottom.

5. A television or radio cabinet substantially triangular in top plan view outline, said cabinet having a substantially right angular rear apex, the hypotenuse side providing a front video or audio face and means for converting said triangular cabinet to a rectangular cabinet comprising short leg side walls, hinge means pivoting said short leg side walls adjacent the rear of said front face, triangular top members complementing the triangular cabinet top to a rectangle, hinge means pivoting one of said triangular top members to one of said short leg side walls along its top edge, and hinge means pivoting the other triangular top member to the other short leg side wall along its top, said hinge means being of the invisible type whereby said short leg side wall and folded top triangular member may fold under the edge of the permanent top member, an apex post extending between the permanent triangular top and triangular bottom, and abutment means on said apex post for supporting said unfolded top members.

6. A television or radio cabinet substantially triangular in top plan view outline, said cabinet having a substantially right angular rear apex, the hypotenuse side providing a front video or audio face and means for converting said triangular cabinet to a rectangular cabinet comprising short leg side walls, hinge means pivoting said short leg side walls adjacent the rear of said front face, triangular top members complementing the triangular cabinet top to a rectangle, hinge means pivoting one of said triangular top members to one of said short leg side walls along its top edge, and hinge means pivoting the other triangular top member to the other short leg side wall along its top, said hinge means being of the invisible type whereby said short leg side wall and folded top triangular member may fold under the edge of the permanent top member, an apex post extending between the permanent triangular top and triangular bottom, abutment means on said apex post for supporting said unfolded top members, and latch means for securing said unfolded top members together.

7. A television or radio cabinet substantially triangular in top plan view outline, said cabinet having a substantially right angular rear apex, the hypotenuse side providing a front video or audio face and means for converting said triangular cabinet to a rectangular cabinet comprising short leg side walls, hinge means pivoting said short leg side walls adjacent the rear of said front face, triangular top members complementing the triangular cabinet top to a rectangle, hinge means pivoting one of said triangular top members to one of said short leg side walls along its top edge, and hinge means pivoting the other triangular top member to the other short leg side wall along its top, said hinge means being of the invisible type whereby said short leg side wall and folded top triangular member may fold under the edge of the permanent top member, an apex post extending between the permanent triangular top and triangular bottom, abutment means on said apex post for supporting said unfolded top members, latch means for securing said unfolded top members together, and brace means for holding said short leg side walls in unfolded position.

8. A television or radio cabinet substantially triangular in top plan view outline, said cabinet having a substantially right angular rear apex, the other two angles being somewhat cut off, the hypotenuse side providing a front video or audio face, the short leg sides having ventilation means for the contained mechanism, and means for converting said triangular cabinet to a rectangular cabinet comprising short leg side walls, detachable hinge means pivoting said short leg side walls adjacent the rear of said front face, triangular top members complementing the triangular cabinet top to a rectangle, and hinge means pivoting one of said triangular top members to one of said short leg side walls along its top edge, and hinge means pivoting the other triangular top member to the other short leg side wall along its top.

9. A television or radio cabinet substantially triangular in top plan view outline, said cabinet having a substantially right angular rear apex, the other two angles being somewhat cut off, the hypotenuse side providing a front video or audio face, the short leg sides having ventilation means for the contained mechanism, and means for converting said triangular cabinet to a rectangular cabinet comprising short leg side walls, detachable hinge means pivoting said short leg side walls adjacent the rear of said front face, triangular top members complementing the triangular cabinet top to a rectangle, and hinge means pivoting one of said triangular top members to one of said short leg side walls along its top edge, and hinge means pivoting the other triangular top member to the other short leg side wall along its top, said hinge means being of the invisible type whereby said short leg side wall and folded top triangular member may fold under the edge of the permanent top member, an apex post extending between the permanent triangular top and triangular bottom, abutment means on said apex post for supporting said unfolded top members, latch means for securing said unfolded top members together, and brace means for holding said short leg side walls in unfolded position.

VICTOR HORN.

REFERENCES CITED

The following references are of record in the file of this patent:

UNITED STATES PATENTS

| Number | Name | Date |
|---|---|---|
| D. 145,237 | Thorne | July 16, 1946 |
| 175,308 | Van Wie | Mar. 28, 1876 |
| 426,957 | Radcliffe | Apr. 29, 1890 |
| 710,680 | Greenfield | Oct. 7, 1902 |
| 728,673 | Clay | May 19, 1903 |
| 1,817,381 | Kideney | Aug. 4, 1931 |